United States Patent

[11] 3,610,730

| [72] | Inventor | Gerald K. Goldberg |
| | | Philadelphia, Pa. |
| [21] | Appl. No. | 868,830 |
| [22] | Filed | Oct. 23, 1969 |
| [45] | Patented | Oct. 5, 1971 |
| [73] | Assignee | Sperry Rand Corporation |
| | | New York, N.Y. |

[54] FLUIDIC PRISM
14 Claims, 4 Drawing Figs.

[52] U.S. Cl. .................................................... 350/157,
350/147, 350/DIG. 2
[51] Int. Cl. ...................................................... G02f 3/00
[50] Field of Search ........................................... 350/147,
150, 157; 356/114

[56] References Cited
UNITED STATES PATENTS
| 1,963,127 | 6/1934 | Gardner | 350/157 |
| 2,427,996 | 9/1947 | Seaman | 350/286 X |

OTHER REFERENCES
Perry, " Visual Flow Analysis" Product Engineering Vol. 26 (Aug. 1955) pp. 154– 161. 350/157
Nickola, " Display Device Using Birefringent Fluid" Vol. 7, No. 4 IBM Tech. Disc. Bull. (Sept. 1964) p. 302. 350/157

*Primary Examiner*—David Schonberg
*Assistant Examiner*—Paul R. Miller
*Attorneys*—Charles C. English, Leonard Zalman and William E. Cleaver ABSTRACT: A fluidic prism having a colloidal suspension, that exhibits streaming birefringence, flowing through first and second hollow cells in different directions such that the components of a light beam polarized in different directions and incident upon the prism are deflected along different paths. When the suspension flows through the cells in substantially mutually orthogonal directions, the deflection paths and the path of the incident light beam are coplanar. When the suspension flows through the cells in other than substantially mutually orthogonal directions, the deflection paths and the path of the incident light beam are in mutually orthogonal planes.

INVENTOR
GERALD K. GOLDBERG

BY Leonard Zalman
ATTORNEY

FLUIDIC PRISM

Conventional crystal Wollaston prisms include first and second triangular-shaped sections of a solid uniaxial material having optic axes extending respectively in first and second mutually orthogonal directions. Due to the orthogonal orientation of the optic axes, the index of refraction of the prism is different for a light beam or component thereof polarized in the first direction than for a light beam or component thereof polarized in the second direction. Because of that difference, a crystal Wollaston prism can deflect, by an angle determined both by the uniaxial material and the apex angle of the triangular-shaped sections, an incident light beam polarized in one of the orthogonal directions from its axis of propagation to one of two different off-axis directions.

The solid nature of a crystal Wollaston prism limits the off-axis deflection angle of the incident light beam to only one value in either of two directions. Using present technology, the minimum off-axis deflection angle that can be achieved is about one minute, but this minimum is achievable only with attendant high cost in the order of hundreds of dollars.

Accordingly, it is an object of the present invention to provide an improved optical prism.

Another object of the present invention is to provide a light deflection prism having a small minimum deflection angle.

Another object of the present invention is to provide an improved light deflection prism having a low cost of manufacture.

A further object of the present invention is to provide an improved light deflection prism having an adjustable deflection angle.

In accordance with the present invention, there is provided a fluidic Wollaston prism in which a colloidal suspension, that exhibits streaming birefringence, is caused to flow through both a first hollow cell of the prism in a first direction and a second hollow cell of the prism in a second direction. The cells have a common boundary surface and each is at least partially optically transparent so that an incident light beam can enter and exit the prism. When the first and second directions are substantially mutually orthogonal, the fluidic Wollaston prism has the light beam deflecting properties of a crystal Wollaston prism.

For a better understanding of the present invention together with other and further objects thereof, reference now should be had to the following detailed description which is to be read in conjunction with the accompanying drawing in which.

Figure 1:
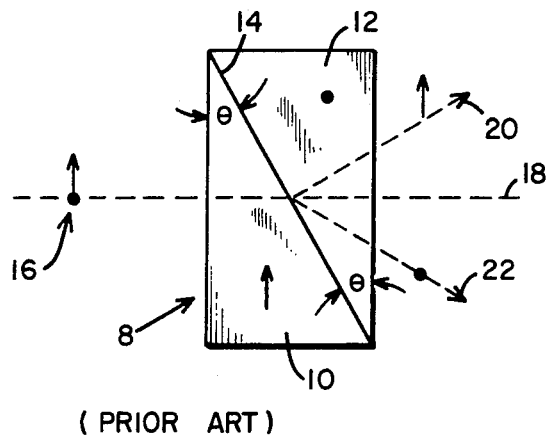
FIG. 1 illustrates a prior art crystal Wollaston prism.

Referring now to the drawing and more particularly to FIG. 1, there is shown a conventional crystal Wollaston prism 8 comprising first and second triangular-shaped sections 10 and 12, respectively, of a uniaxial material, for example, quartz. Sections 10 and 12, which can have an apex angle $\theta$ of about 30°, are bonded together rigidly by a layer 14 of glycerin or castor oil. Cell 10 is oriented so that its optic axis extends in a vertical direction, that is, in a direction parallel to the Y-axis of the plane of the drawing, as indicated by the arrow within cell 10, and cell 12 is oriented so that its optic axis extends in a horizontal direction, that is, in a direction transverse to the plane of the drawing, as indicated by the dot in cell 12. When a polarized light beam 16, from, for example, a laser (not shown) is incident upon prism 8, the component of the light beam polarized in the vertical direction (arrow) is deflected from its propagation path 18 to a path indicated by arrow 20 and the component of the light beam polarized in the horizontal direction (dot) is deflected from path 18 to a path indicated by arrow 22. Paths 18, 20 and 22 are coplanar.

Figure 2:
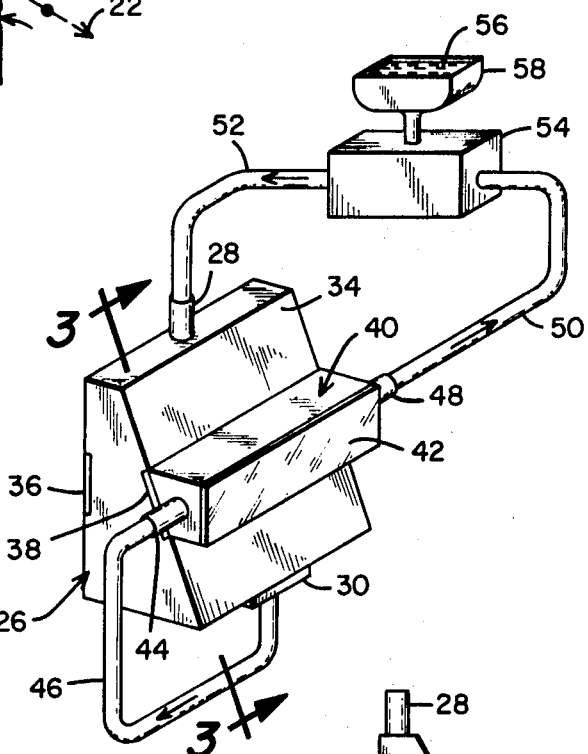
FIG. 2 is a perspective view of a preferred embodiment of the fluidic prism of the present invention.
Figure 3:
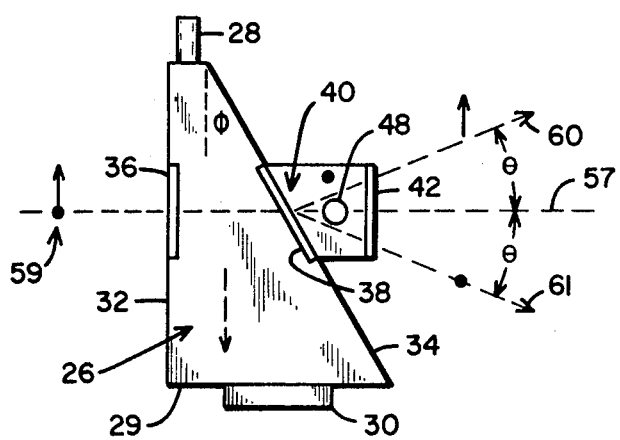
FIG. 3 is a side view of a portion of the prism of FIG. 2 taken along line 3—3.

Referring now to FIGS. 2 and 3, one preferred embodiment of the fluidic Wollaston prism of the present invention includes a first hollow, triangular-shaped cell 26 having fluid input and output ports 28 and 30, respectively. To reduce turbulence, port 30 is larger than port 28 and is disposed in the central portion of wall 29 of cell 26. Walls 32 and 34 of cell 26 are provided with light transparent panels 36 and 38, respectively. A portion of panel 38 constitutes a wall of a second hollow, trapezoidal-shaped cell 40 which has another light transparent panel 42. By way of illustration, the walls of cells 26 and 40 may be quarter inch thick Plexiglas and panels 36, 38, and 42 may be high quality optical glass.

Cell 40 has a fluid input port 44, connected to fluid output port 30 of cell 26 by a hose section 46 of a suitable conventional material, and a fluid output port 48, which is coaxial with input port 44 and connected to fluid input port 28 of cell 26 by hose sections 50 and 52 which are coupled together by a suitable conventional fluid pump 54 having desirably a fixed pumping rate. Pump 54 forces through cells 26 and 40 and hoses 46, 50, and 52 (in the direction shown by the arrows in FIG. 2) a colloidal suspension 56 which is stored in a reservoir 58. By way of illustration, the flow rate of suspension 56 can be between 5 cubic centimeters per second and 50 cubic centimeters per second.

Colloidal suspension 56 may be any suspension having elongated particles that exhibit an optical anisotropy due to streaming birefringence. By streaming birefringence it is meant that the elongated particles of a suspension will align their longitudinal dimension along the flow line of the suspension. Colloidal suspension 54 can be, for example, an aqueous suspension of milling yellow NGS having a density of about 0.013 grams per cubic centimeter of water and substantially elliptical-shaped particles with a major axis measuring about one micron. Milling yellow NGS is a commercial dye product of the National Aniline Division of the Allied Chemical and Dye Corporation. Aqueous milling yellow NGS having the desired density can be prepared by mixing about one cubic centimeter of dry powder milling yellow NGS with about eight cubic centimeters of water and then heating the mixture to near the boiling point of the water, to both completely dissociate the dry powder in the water and evaporate any excess water. Once dissociated, the milling yellow NGS will not precipitate when cooled to room temperature. Other aqueous colloidal suspensions exhibiting streaming birefringence, such as, for example, vanadium pentoxide and ethyl cinnamate, and having a density on the order of about 0.013 grams per cubic centimeter of water are also suitable for use as suspension 56. Nonaqueous suspensions, such as, for example, polyethylene dispersed in xylene, polydimethylsiloxan dispersed in benzene, polyvinylpyrrolidone dispersed in benzyl alcohol, polystyrene dispersed in bromoform, polymethylmethacrylate dispersed in benzene, and nitrocellulose dispersed in cyclohenanone are also suitable for use as suspension 56. Other suitable suspensions are listed on pages 662—664 of volume 6, number 5, of the Soviet Physics Uspekhi, dated March—April, 1964.

Due to the placement of ports 28, 30, 44, and 48, suspension 56 flows through cell 26 in an approximately vertical direction and through cell 40 in an approximately horizontal direction. I have found that when the suspension 56 is in motion, the internal shear stresses on the particles of the suspension due to viscosity and velocity gradients makes the suspension optically anisotropic with a favored optic axis in the flow direction of the suspension. Accordingly, cell 26 behaves as an optically anisotropic medium having a favored optic axis in the direction of the flow therethrough of suspension 56, that is, in the vertical direction (indicated by the dashed arrow in cell 26 of FIG. 3) and cell 40 likewise behaves as an optically anisotropic medium having a favored optic axis in the direction of the flow of suspension 56 therethrough, that is, in the horizontal direction (indicated by the dot in cell 40 of FIG. 3). Comparison of the fluidic Wollaston prism of FIG. 3 with the crystal Wollaston prism of FIG. 1 shows that they are optically identical, that is, both prisms have two components with favored optic axes extending in mutually orthogonal directions. Thus, the fluidic Wollaston prism of FIGS. 2 and 3 has the same light deflection properties as a crystal Wollaston prism as indicated in FIG. 3 by the deflection, by the angle θ, of the vertical and horizontal light components of an incident light beam 59 along respective paths 60 and 61 coplanar with the projection path 57 of light beam 59.

Figure 4:
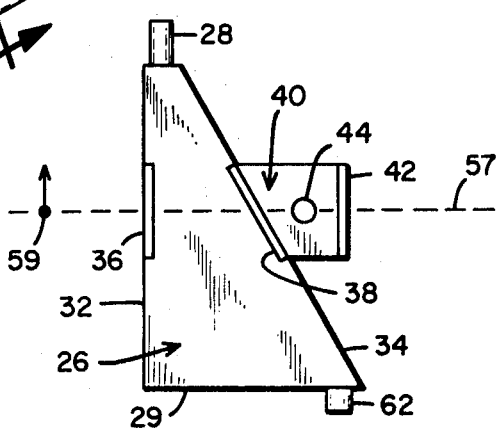
FIG. 4 is a side view of another preferred embodiment of the fluidic prism of the present invention.

In the fluidic prism of FIG. 4, in which parts corresponding to like parts of FIGS. 2 and 3 have the same reference numbers, the output port 62 of cell 26 is disposed adjacent wall 34 and is approximately the same size as port 28. For reasons not fully understood, this fluidic prism deflects the horizontal and vertical components of an incident light beam propagated along path 57 such that these components exit the prism along paths which are not coplanar with path 57. That is, the components exit the prism along paths which are in a plane transverse to the plane containing path 57 (the plane of the drawing). The direction of these deflection paths can be modulated by changing the flow rate of suspension 56.

My fluidic prisms separate the horizontal and vertical components of an incident light beam by an amount less that that produced by a crystal Wollaston prism. More precisely, my fluidic prisms can produce a separation between the components of an incident light beam of substantially less than one minute. According, my fluidic prisms are particularly useful in systems having a succession of light responsive elements. In addition, my fluidic prisms can be manufactured at a cost on the order of tens of dollars, whereas, as previously mentioned, the cost of a crystal Wollaston prism is on the order of hundreds of dollars.

While the invention has been described with reference to a particular embodiment thereof, various modifications can be made without departing from the invention. For example, suspension 56 can be pumped through cells 26 and 40 in opposite directions, that is, through cell 26 from bottom to top and through cell 40 out of the plane of the drawing. Furthermore, the shape of cells 26 and 40 can be changed provided only that the optically transparent panel common to cells 26 and 40 is not positioned normal to the propagation axis of the incident light beam because at the normal angle of incidence there is no refraction of the incident light beam.

In addition, cells 26 and 40 can be made entirely of high quality optical glass. However, with this construction care must be taken to prevent impingement of unwanted background light on the prism.

Typically, the interior of triangular-shaped cell 26 may have a width of 5 inches, a height of 4 inches, a depth of ¼ inch, and an angle Φ of 30°, and the interior of trapezoidal-shaped cell 40 may have a height of 3/5 inch, a depth of 4 inches, a long side width of 1 inch, and a short side width of 3/5 inch. Fluid ports 28, 44, 48 and 62 can have an internal area of 0.11 square inches and fluid port 30 can have an internal area of 0.5 square inches.

I claim:

1. A light-deflecting prism comprising first and second hollow cells, said first and second cells are disposed in sequence and have optically transparent portions so that a light beam can pass successively therethrough, a source of a colloidal suspension having particles shaped such that the suspension can exhibit streaming birefringence, and means coupled to said source and said cells for causing said suspension to flow through said first cell in a first direction and through said second cell in a second direction whereby said first cell has a favored optic axis with a major component extending in said first direction and said second cell has a favored optic axis with a major component extending in said second direction, such that the components of an incident light beam polarized in said first and second directions are deflected along different paths.

2. The prism according to claim 1 wherein said first and second directions are substantially mutually orthogonal.

3. The prism according to claim 2 wherein the flow rate of said suspension is between 5 cubic centimeters per second and 50 cubic centimeters per second.

4. The prism according to claim 1 wherein said first and second cells have a common optically transparent wall.

5. The prism according to claim 4 wherein said first cell has two fluid ports located at different distances from said common wall.

6. The prism according to claim 4 wherein said first cell has two fluid ports located at substantially the same distance from said common wall.

7. The prism according to claim 4 wherein said common wall is skew to the path of propagation of said incident light beam.

8. The prism according to claim 3 wherein said suspension is aqueous and has a density of about 0.013 grams of said particles per cubic centimeter of water, and said particles have a longitudinal dimension of about one micron.

9. A prism according to claim 1 wherein the flow rate of said suspension is between 5 cubic centimeters per second and 50 cubic centimeters per second, and said suspension is aqueous and has a density of about 0.013 grams of said particles per cubic centimeter of water.

10. A method of deflecting polarized components of a light beam along different paths comprising:
   pumping a colloidal suspension having particles shaped such that the suspension exhibits streaming birefringence through both a first cell in a first direction and a second cell in a second direction; and
   passing a light beam successively through said cells.

11. The method according to claim 10 wherein said first and second directions are substantially mutually orthogonal.

12. The method according to claim 10 wherein said suspension is aqueous and has a density of about 0.013 grams of said particles per cubic centimeter of water, and said particles have a longitudinal dimension of about one micron.

13. The method according to claim 10 wherein said suspension is pumped through said cells at a rate between 5 cubic centimeters per second and 50 cubic centimeters per second.

14. A method of deflecting the polarized components of a light beam in different, variable directions comprising:
   pumping at a first flow rate a colloidal suspension having particles shaped such that said suspension exhibits streaming birefringence through first and second optically transparent cells in different directions;
   projecting a light beam successively through said first and second cells; and
   pumping said suspension through said cells at a second flow rate different from said first flow rate.